United States Patent
Nakaso et al.

(10) Patent No.: US 8,179,086 B2
(45) Date of Patent: May 15, 2012

(54) CONTROL APPARATUS AND CONTROL METHOD

(75) Inventors: Yoshiaki Nakaso, Kobe (JP); Ryuichi Kamaga, Nissin (JP)

(73) Assignees: Fujitsu Ten Limited, Kobe (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/682,823

(22) PCT Filed: Sep. 28, 2009

(86) PCT No.: PCT/JP2009/066748
§ 371 (c)(1),
(2), (4) Date: Apr. 13, 2010

(87) PCT Pub. No.: WO2010/047207
PCT Pub. Date: Apr. 29, 2010

(65) Prior Publication Data
US 2011/0057611 A1     Mar. 10, 2011

(30) Foreign Application Priority Data
Oct. 23, 2008 (JP) .................................. 2008-272583

(51) Int. Cl.
*H01M 10/46* (2006.01)
(52) U.S. Cl. ....................................................... 320/104
(58) Field of Classification Search .................. 320/104, 320/107, 109, 111, 114, 128, 137
See application file for complete search history.

(56) References Cited

U.S. PATENT DOCUMENTS

| | | | | |
|---|---|---|---|---|
| 4,709,202 | A | * | 11/1987 | Koenck et al. ................ 320/112 |
| 6,895,280 | B2 | * | 5/2005 | Meadows et al. ............... 607/46 |
| 7,177,690 | B2 | * | 2/2007 | Woods et al. .................... 607/29 |

FOREIGN PATENT DOCUMENTS

| | | |
|---|---|---|
| JP | A-07-123519 | 5/1995 |
| JP | A-10-178701 | 6/1998 |
| JP | A-10-304582 | 11/1998 |
| JP | A-2007-228695 | 9/2007 |

OTHER PUBLICATIONS

International Search Report issued in PCT/JP2009/066748, mailed on Dec. 8, 2009 (with translation).
Kissel, G., "PHEV Charge Coupler & Cord Set Practices," SAE international Agenda, 2007.
"Electric Vehicle Conductive Charging System General Requirements, Japan Electric Vehicle Association Standard," 2001, JEVS, vol. G, No. 109.
"Ace Charging System (Advanced Conductive EV Charging System)," Specification for the EVSE, 2006, vol. 98-000141-00, No. 1.15.

* cited by examiner

*Primary Examiner* — Edward Tso
(74) *Attorney, Agent, or Firm* — Oliff & Berridge, PLC

(57) ABSTRACT

To properly resume charging when insertion and removal of a charging cable connector are repeated, a control apparatus includes a power control unit that turns on a charging mode signal when a signal state changes from a state with no change for a certain period of time to a changed state, to activate a charging control unit, and turns off the charging mode signal when detecting a charging completion signal turned on by the charging control unit and outputted from a signal generating unit included in the charging cable which connects an external power source to the vehicle; and the charging control unit turns on the charging completion signal when the charging has been completed, and thereafter turns off the charging completion signal when detecting that the charging mode signal has been turned off by the power control unit.

6 Claims, 9 Drawing Sheets

US 8,179,086 B2

CONTROL APPARATUS AND CONTROL METHOD

This application is the U.S. national phase of international application PCT/JP2009/066748, filed on Sep. 28, 2009, which designated the U.S. and claims priority to JP Application No. 2008-272583 filed on Oct. 23, 2008. The entire contents of these applications are incorporated herein by reference.

TECHNICAL FIELD

The present invention relates to a control apparatus and a control method for charging an energy storage apparatus for vehicle drive which is mounted on a vehicle.

BACKGROUND ART

As environmentally friendly vehicles, electric vehicles, hybrid vehicles, fuel cell vehicles, etc., have received attention in recent years. On these vehicles, an electric motor that generates a traveling driving force and an energy storage apparatus that stores electrical energy to be supplied to the electric motor are mounted. On hybrid vehicles, an internal combustion engine is further mounted as a power source, in addition to the electric motor. On fuel cell vehicles, fuel cells are mounted as a direct-current power source for electric motor drive.

Vehicles are known that can directly charge an energy storage apparatus for electric motor drive mounted on such vehicles, from an ordinary household power source. For example, electrical energy is supplied to the energy storage apparatus from an ordinary household power source by connecting a commercial power outlet provided in a house to a charging inlet provided in the vehicle, by a charging cable. A vehicle that can directly charge an energy storage apparatus mounted on the vehicle from a power source external to the vehicle in the above-described manner is referred to as a "plug-in vehicle".

Plug-in vehicle standards are established in the United States by "SAE Electric Vehicle Conductive Charge Coupler" (Non-Patent Document 1) and are established in Japan by "General Requirements for Electric Vehicle Conductive Charging System" (Non-Patent Document 2).

"SAE Electric Vehicle Conductive Charge Coupler" and "General Requirements for Electric Vehicle Conductive Charging System" define, as an example, a standard for control pilot. The control pilot is defined as a control line that connects a control circuit for EVSE (Electric Vehicle Supply Equipment) which supplies electrical energy to a vehicle from a premises wiring, to a ground unit of the vehicle through a control circuit on the vehicle side. Based on pilot signals communicated through the control line, a connection state of a charging cable, whether electrical energy can be supplied to the vehicle from a power source, a rated current of the EVSE, etc., are determined.

A connector of a charging cable is provided with a connection switch for detecting insertion of the connector into a charging inlet on the vehicle side. A PISW signal which is a state signal of the connection switch is inputted to a control apparatus that performs charging control of an energy storage apparatus mounted on the vehicle.

The control apparatus on the vehicle side includes a CPU that functions as a power control unit that controls a power source for vehicle system control; and a CPU that functions as a charging control unit that performs charging control of the energy storage apparatus.

The charging control unit controls the charging of the energy storage apparatus by determining whether it is a chargeable state, based on a charging mode signal inputted from the power control unit. The power control unit controls the power source for control by determining whether it is in the process of charging or charging has been completed, based on a charging completion signal inputted from the charging control unit.

Specifically, the power control unit is configured as follows. When the power control unit detects a rising edge (hereinafter, referred to as an "on edge") of a PISW signal which is generated when the connector of the charging cable is inserted into the charging inlet on the vehicle side, the power control unit determines that the charging cable has been connected to the vehicle side, and thus, turns on a charging mode signal to activate the charging control unit. When the power control unit detects that a charging completion signal outputted from the charging control unit has been turned on, the power control unit determines that charging has been completed, and thus, turns off the charging mode signal.

Correspondingly, the charging control unit is configured as follows. When the charging mode signal is turned on by the power control unit, the charging control unit charges the energy storage apparatus mounted on the vehicle, with electrical energy supplied from an external power source through the charging cable. When the charging is completed, the charging control unit turns on the charging completion signal.

PRIOR-ART DOCUMENT

Patent Document

[Patent Document 1] Japanese Patent Application Laid-Open No. 10-304582

Non-Patent Document

[Non-Patent Document 1] "SAE Electric Vehicle Conductive Charge Coupler" (the United States), SAE Standards, SAE International, November 2001

[Non-Patent Document 2] "General Requirements for Electric Vehicle Conductive Charging System", Japan Electric Vehicle Association Standard (Japan Electric Vehicle Standard), Mar. 29, 2001

SUMMARY OF THE INVENTION

Problems to be Solved by the Invention

In the above-described control apparatus, since charging control by the charging control unit starts by the power control unit detecting an on edge of the PISW signal, there is an inconvenience in that if the power control unit cannot detect an on edge of the PISW signal, charging of the energy storage apparatus is not performed.

For example, When, after charging is started by connecting the charging cable to the vehicle, the plug of the charging cable is pulled out of the external power source, the control pilot signal is disrupted and thus the charging is interrupted. Even if the plug is reconnected to the external power source, the control apparatus cannot detect an on edge of the PISW signal.

In addition, when, after charging is started by connecting the charging cable to the vehicle, a power failure occurs in the external power source, the control pilot signal is disrupted and thus the charging is interrupted. Even if the power failure is recovered afterward, the control apparatus cannot detect an on edge of the PISW signal.

To resume charging control in such cases, a cumbersome operation is required such as removing the charging cable from the vehicle once and then again inserting the connector of the charging cable to the charging inlet on the vehicle side.

Hence, the power control unit is configured to turn on the charging mode signal to activate the charging control unit when detecting, instead of the PISW signal, an on edge of the control pilot signal which appears when the state of the control pilot signal changes from a state with no change for a certain period of time, the control pilot signal being a control signal outputted from a signal generating unit which is a control circuit included in the charging cable.

According to such a configuration, even if, after charging is started by connecting the charging cable to the vehicle, the plug of the charging cable is pulled out of the external power source and the control pilot signal is disrupted and thus the charging is interrupted, when the plug is reconnected to the external power source, an on edge of the control pilot signal can be detected by the power control unit.

In addition, even if, after charging is started by connecting the charging cable to the vehicle, a power failure occurs in the external power source and the charging is interrupted, when the power failure is recovered afterward, an on edge of the control pilot signal can be detected by the power control unit.

The charging control unit activated by the power control unit is configured to charge the energy storage apparatus with electrical energy supplied from the external power source and turn on the charging completion signal when the charging is completed and then output the charging completion signal to the power control unit. The power control unit having detected the charging completion signal is configured to turn off the charging mode signal.

Furthermore, the charging control unit is configured such that, when the connector of the charging cable is pulled out of the vehicle while the energy storage apparatus is charged by the charging control unit, the charging control unit terminates the charging of the energy storage apparatus in midstream and turns on the charging completion signal and then outputs the charging completion signal to the power control unit.

Then, the charging completion signal outputted from the charging control unit is held during a period of time between after charging control is completed and before feeding to the charging control unit is stopped.

Thus, there is a problem that when, during a period of time from when the connector of the charging cable is pulled out of the vehicle in the process of charging until feeding to the charging control unit is stopped afterward, the connector is reconnected to the charging inlet of the vehicle, charging cannot be resumed.

Charging cannot be resumed because even if the power control unit detects an on edge of the control pilot signal and outputs a charging mode signal to the charging control unit, when the power control unit detects a charging completion signal being in an on state which is outputted from the charging control unit, the power control unit determines that charging has been completed and thus operates to turn off the charging mode signal.

In view of the above-described problems, an object of the present invention is therefore to provide a control apparatus and a control method that can properly resume charging even when insertion and removal of a connector of a charging cable are repeated.

Means for Solving the Problems

In order to solve the above problems, a first aspect of the present invention provides a control apparatus that charges an energy storage apparatus mounted on a vehicle, with electrical energy supplied through a charging cable from a power source external to the vehicle, the control apparatus including: a power control unit that turns on a charging mode signal when a state of a signal changes from a state with no change for a certain period of time to a state with a change, to activate a charging control unit, and turns off the charging mode signal when detecting a charging completion signal which is turned on by the charging control unit, the signal being outputted from a signal generating unit included in the charging cable and being according to a state of electrical energy supply from the power source; and the charging control unit that charges the energy storage apparatus through the charging cable when detecting the charging mode signal which is turned on by the power control unit, and turns on the charging completion signal when the charging has been completed, and thereafter turns off the charging completion signal when detecting that the charging mode signal has been turned off by the power control unit.

That is, when electrical energy supply from the external power source is stopped during charging, such as when the connector of the charging cable is removed from the vehicle, a charging completion signal indicating the completion of charging is turned on by the charging control unit and a charging mode signal is turned off by the power control unit that has detected that the charging completion signal has been turned on.

The charging control unit having turned on the charging completion signal turns off the charging completion signal when detecting that the charging mode signal has been turned off by the power control unit.

Accordingly, when insertion and removal of the connector of the charging cable are repeated, since the charging completion signal has already been reset by the power control unit at the point in time when the power control unit turns on the charging mode signal again, an inconvenient situation can be circumvented in which the charging mode signal is reset as a result of an erroneous determination made by the power control unit that charging has been completed.

Effect of the Invention

As described above, according to the present invention, a control apparatus and a control method can be provided that can properly resume charging even when insertion and removal of a connector of a charging cable are repeated.

EMBODIMENTS OF THE INVENTION

An embodiment for the case in which a control apparatus of the present invention is applied to a plug-in vehicle will be described below.

Figure 1:
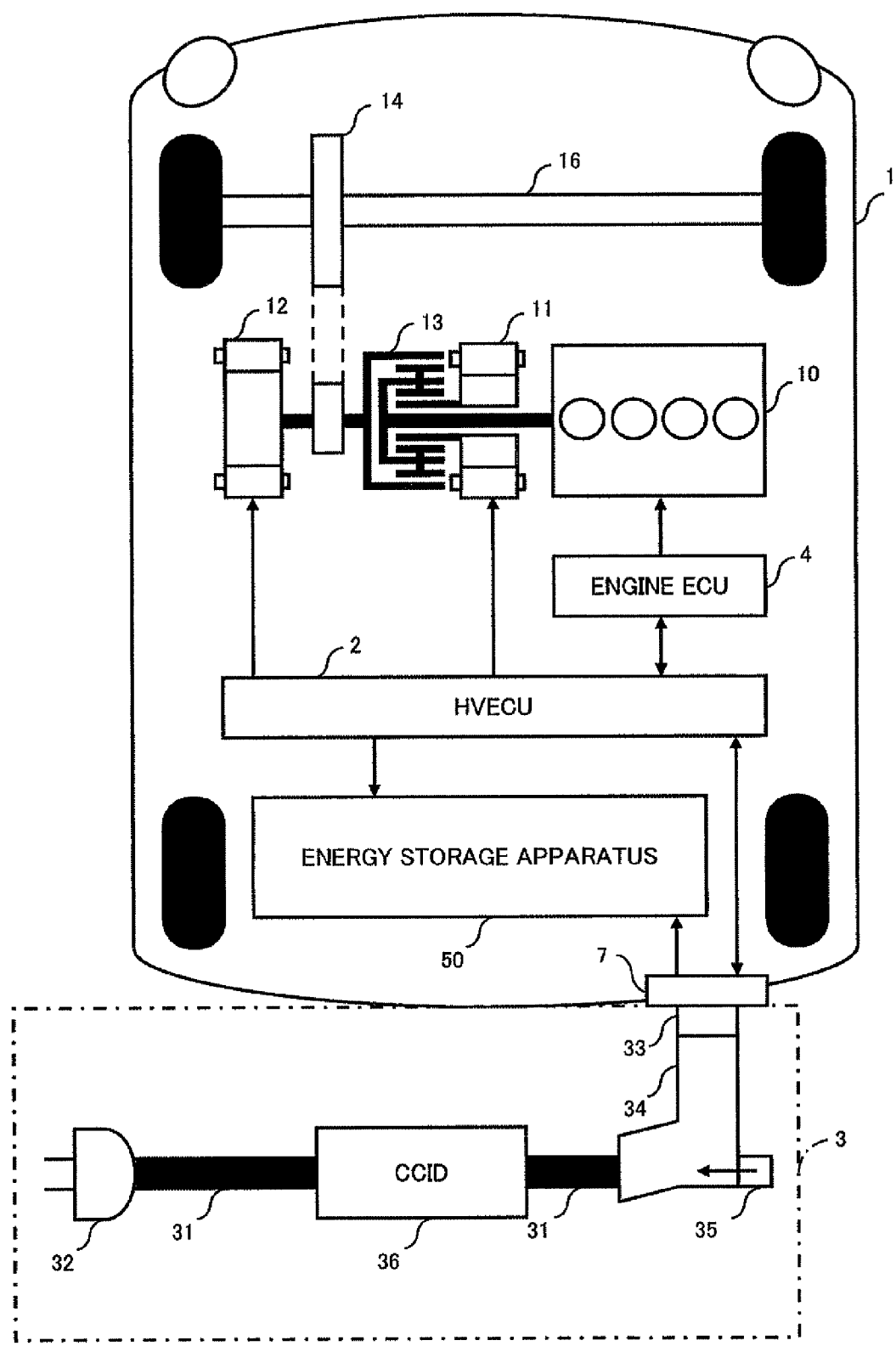
FIG. 1 is an overall configuration diagram of a plug-in hybrid vehicle which is shown as an example of a vehicle according to an embodiment of the present invention.

As shown in FIG. 1, a hybrid vehicle 1 which is an example of a plug-in vehicle (hereinafter, referred to as the "plug-in hybrid vehicle") that can directly charge a high-voltage energy storage apparatus 50 mounted on the vehicle from a power source external to the vehicle includes, as power sources, an engine 10, a first MG (Motor Generator) 11, and a second MG (Motor Generator) 12.

In the plug-in hybrid vehicle 1, the engine 10, the first MG 11, and the second MG 12 are coupled to a power split mechanism 13 so that the plug-in hybrid vehicle 1 can travel by a driving force from at least one of the engine 10 and the second MG 12.

The first MG 11 and the second MG 12 each is configured by an alternating-current dynamo-electric machine. For example, a three-phase alternating-current synchronous rotating machine including a U-phase coil, a V-phase coil, and a W-phase coil is used.

The power split mechanism 13 is configured by a planetary gear mechanism which includes a sun gear, pinion gears, a carrier, and a ring gear and in which the pinion gears engage with the sun gear and the ring gear.

The carrier which supports the pinion gears such that the pinion gears can rotate on their axis is coupled to a crankshaft of the engine 10. The sun gear is coupled to a rotating shaft of the first MG 11. The ring gear is coupled to a rotating shaft of the second MG 12 and a speed reducer 14.

Figure 2:
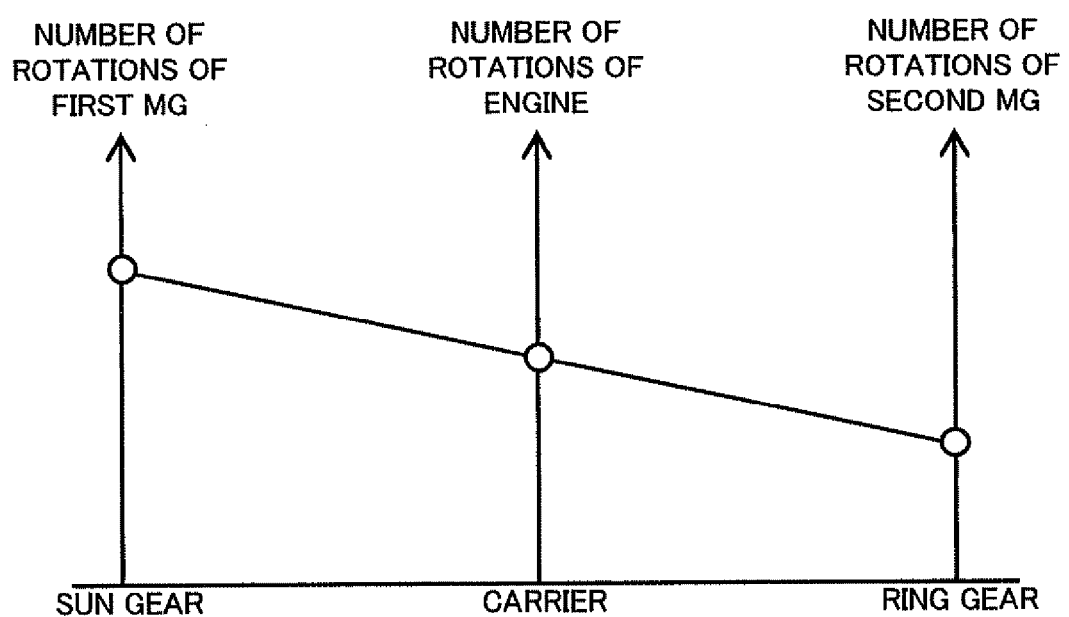
FIG. 2 is an alignment chart of a power split mechanism.

As shown in FIG. 2, in the planetary gear mechanism, a correlation is established in which when the numbers of rotations of any two of the sun gear, the ring gear, and the carrier are determined, the number of rotations of the remaining one is determined fixedly, and the numbers of rotations of the engine 10, the first MG 11, and the second MG 12 are connected to one another by a straight line in an alignment chart.

Figure 3:
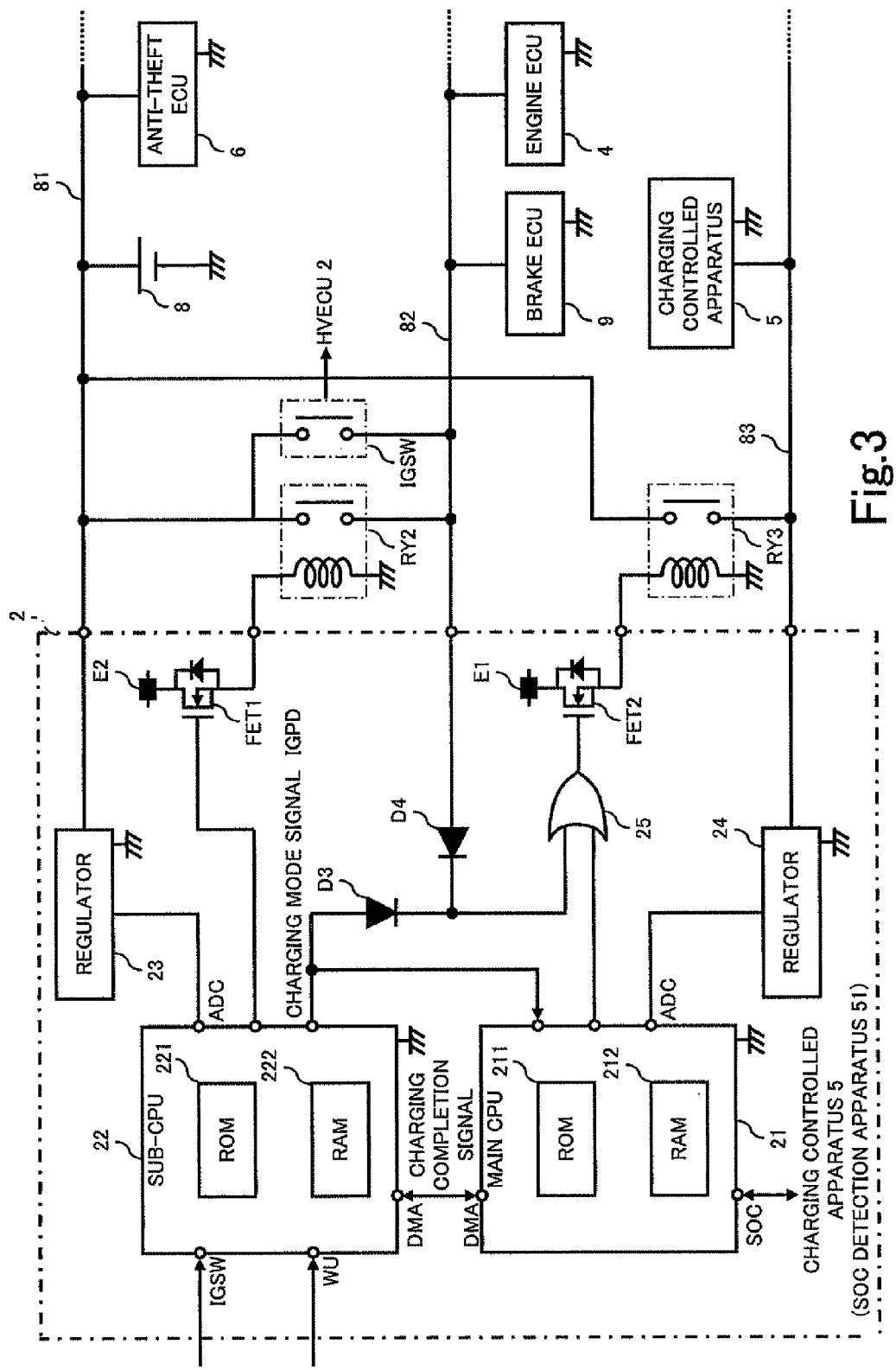
FIG. 3 is an overall configuration diagram of an electronic control apparatus included in the plug-in hybrid vehicle shown in FIG. 1.

As shown in FIG. 3, on the plug-in hybrid vehicle 1 are mounted a plurality of electronic control apparatuses (hereinafter, referred to as the "ECUs") such as a hybrid vehicle ECU (hereinafter, referred to as the "HVECU") 2 that performs overall control of the power of the vehicle and functions as a control apparatus of the present invention, an engine ECU 4 that controls the engine 10, a brake ECU 9 that controls a braking mechanism, and an anti-theft ECU 6 that implements an anti-theft function; and a charging controlled apparatus 5 that charges the energy storage apparatus 50 based on an instruction from the HVECU 2.

Each ECU includes a single or plurality of microcomputers having a CPU, a ROM, and a RAM.

To supply electrical energy to each ECU, the plug-in hybrid vehicle 1 is provided with three feeding systems including a first feeding system 81, a second feeding system 82, and a third feeding system 83 which are fed from a low-voltage energy storage apparatus 8 (e.g., DC 12V).

The first feeding system 81 is a feeding system which is directly fed from the low-voltage energy storage apparatus 8 even when an ignition switch IGSW is in an off state. An ECU for a body monitoring system, such as the anti-theft ECU 6, and the HVECU 2 are connected to the first feeding system 81.

The second feeding system 82 is a feeding system which is fed from the low-voltage energy storage apparatus 8 through a power relay RY 2 when the ignition switch IGSW is in an on state. ECUs that control a powertrain system, such as the engine ECU 4 and the brake ECU 9, and ECUs that control a body system such as wipers and door mirrors are connected to the second feeding system 82.

The third feeding system 83 is a feeding system which is fed from the low-voltage energy storage apparatus 8 through a power relay RY3. ECUs related to charging control of the energy storage apparatus 50, such as the HVECU 2 and the charging controlled apparatus 5, are connected to the third feeding system 83.

The powertrain system ECUs and the charging system ECUs are interconnected through a CAN (Controller Area Network) bus. The body system ECUs are interconnected through a LIN (Local Interconnect Network) bus. Furthermore, the CAN bus and the LIN bus are interconnected through a gateway. Namely, the ECUs can perform transmission and reception of necessary control information with each other through these communication buses.

On each ECU is mounted a DC regulator that generates a control voltage of a predetermined level (e.g., DC 5V) from a direct-current voltage of DC 12V supplied from the low-voltage energy storage apparatus 8. An output voltage from the DC regulator is supplied to a control circuit such as a CPU included in the ECU.

The HVECU 2 controls the states of feeding from the low-voltage energy storage apparatus 8 through the second feeding system 82 and the third feeding system 83, based on an operation on the ignition switch IGSW.

The HVECU 2 includes a first microcomputer including a sub-CPU 22 which functions as a power control unit; and a second microcomputer including a main CPU 21 which functions as a traveling control unit and a charging control unit.

The two microcomputers are respectively provided with ROMs 221 and 211 having stored therein their respective control programs; and RAMs 222 and 212 used as working areas during their respective controls.

Furthermore, the first microcomputer and the second microcomputer are provided with DMA controllers, respectively, so that the CPUs 22 and 21 can read each other's information stored in the RAMs 222 and 212, and are connected to each other by a DMA communication line which is communicable at a predetermined period (e.g., 8 msec) through the DMA controllers. Note that the main CPU 21 is provided with a nonvolatile memory used to save important control data from the RAM 212 upon power-off.

In the RAM 212 and the nonvolatile memory, information about charging control such as an SOC of the energy storage apparatus 50 which is detected by an SOC detection apparatus 51, information about abnormality which is outputted from each ECU upon occurrence of abnormality, and the like, are stored as a backup.

The sub-CPU 22 is fed at all times from the first feeing system 81 through a regulator 23. When the ignition switch IGSW is operated to ON with the power relay RY2 being turned off, the sub-CPU 22 controls to turn on a field-effect transistor (hereinafter, referred to as the "FET") FET1 to turn on the power relay RY2, whereby feeding to the second feeding system 82 from the low-voltage energy storage apparatus 8 starts and the feeding state is maintained.

When the power relay RY2 is turned on, the ECUs connected to the second feeding system 82 are activated and perform their respective intended control operations.

When feeding from the second feeding system 82 starts, a high-level control signal is inputted to one input terminal of an OR circuit 25 from the second feeding system 82 through a diode D4.

By a high-level signal outputted from the OR circuit 25 at this time, a FET2 is turned on, whereby the power relay RY3 is turned on and accordingly feeding to the third feeding system 83 from the low-voltage energy storage apparatus 8 also starts.

Thus, when the ignition switch IGSW is operated to ON, the main CPU 21 is also fed from the third feeding system 83 through a regulator 24 and is activated. The main CPU 21 outputs a high-level signal to the other input terminal of the OR circuit 25 and thereby maintains the on state of the power relay RY3.

When the fact that the ignition switch IGSW is operated to OFF with the power relay RY2 being closed is detected by the sub-CPU 22 and information about such the fact is transmitted to the main CPU 21, the main CPU 21 sends the fact that the ignition switch IGSW is turned off, through the CAN bus to urge each ECU connected to the second feeding system 82 to perform a shutdown process.

When the main CPU 21 recognizes the completion of a shutdown process of each ECU through the CAN bus and completes a shutdown process of itself, the main CPU 21 outputs a low-level control signal to the other input terminal of the OR circuit 25 and further turns off the power relay RY2 through the sub-CPU 22 and thereby stops the states of feeding to the second feeding system 82 and the third feeding system 83.

The shutdown process indicates a process of stopping various actuators being driven, a process of saving control data, such as an SOC, in the nonvolatile memory, and the like, which are performed upon turning off of the ignition switch IGSW. For example, for the engine ECU 4, the shutdown process indicates a process of stopping the engine 10 and a process of saving data for engine control which includes various learning data such as an air/fuel ratio, in the nonvolatile memory.

The sub-CPU 22 transitions to a standby state which is a low power consumption mode, after turning off the power relay RY2. The standby state is a state in which the sub-CPU 22 executes a stop instruction or a halt instruction and thereafter stops its operation.

When an ignition switch IGSW signal is inputted to an interrupt terminal PIG of the sub-CPU 22 having transitioned to the standby state, the sub-CPU 22 returns to a normal operating state from the standby state and controls to turn on the FET1 to turn on the power relay RY2. That is, the ignition switch IGSW signal serves as a wake-up signal which causes the sub-CPU 22 having transitioned to a standby state to return to a normal state.

Note that the ignition switch IGSW may be a switch of either type, a momentary switch or an alternate switch. When a momentary switch is used, the HVECU 2 holds a current state in the RAM 222 as flag data and whether the switch is turned on or off is determined by an operation edge of the switch based on the flag data. Alternatively, a switch may be used that is operated by rotation by inserting a key into a conventional key cylinder.

In the following, traveling control of the vehicle by the HVECU 2 after the ignition switch IGSW is turned on will be described in detail. The HVECU 2 performs traveling control of the vehicle based on a driver's accelerator operation, etc., after the ignition switch IGSW is operated to ON and the power relays RY2 and RY3 are closed.

The HVECU 2 monitors the charging state of the energy storage apparatus 50 (hereinafter, referred to as the "SOC (State Of Charge)") through the SOC detection apparatus 51 (see FIG. 4) For example, when the SOC is lower than a predetermined value, the HVECU 2 starts the engine 10 through the engine ECU 4 and stores electrical energy generated by the first MG 11 which is driven through the power split mechanism 13, in the energy storage apparatus 50.

Specifically, electrical energy generated by the first MG 11 is stored in the energy storage apparatus 50 after the electrical energy is converted from alternating current to direct current through an inverter and the voltage of the direct current is adjusted through a converter. At this time, a part of power generated by the engine 10 is transmitted to driving wheels 16 through the power split mechanism 13 and the speed reducer 14.

In addition, when the SOC is within a predetermined range, the HVECU 2 drives the second MG 12 using at least one of the electrical energy stored in the energy storage apparatus 50 or the electrical energy generated by the first MG 11, to assist the power of the engine 10. The driving force of the second MG 12 is transmitted to the driving wheels 16 through the speed reducer 14.

Furthermore, when the SOC is equal to or higher than the predetermined value, the HVECU 2 stops the engine 10 through the engine ECU 4 and drives the second MG 12 using the electrical energy stored in the energy storage apparatus 50.

Meanwhile, upon braking of the vehicle, etc., the HVECU 2 controls, as a power generator, the second MG 12 which is driven by the driving wheels 16 through the speed reducer 14, and stores electrical energy generated by the second MG 12 in the energy storage apparatus 50. That is, the second MG 12 is used as a regenerative brake which converts braking energy into electrical energy.

That is, the HVECU 2 controls the engine 10, the first MG 11, and the second MG 12, based on required torque of the vehicle which is calculated based on the amount of operation of an accelerator pedal, the SOC of the energy storage apparatus 50, etc.

Although FIG. 1 shows the case in which the driving wheels 16 driven by the second MG 12 are front wheels, instead of the front wheels, rear wheels may be used as the driving wheels 16 or both the front wheels and the rear wheels may be used as the driving wheels 16.

The high-voltage energy storage apparatus 50 is a chargeable/dischargeable direct-current power source and is configured by, for example, a nickel-metal hydride or lithium ion secondary battery. The voltage of the energy storage apparatus 50 is on the order of, for example, 200 V. The energy storage apparatus 50 is configured to be charged with electrical energy supplied from a power source external to the vehicle, in addition to electrical energy generated by the first MG 11 and the second MG 12.

As the energy storage apparatus 50, a large-capacitance capacitor can also be adopted. The type and configuration of the energy storage apparatus 50 are not limited as long as the energy storage apparatus is an electrical energy buffer that can temporarily store electrical energy generated by the first MG 11 and the second MG 12 and electrical energy from a power source external to the vehicle and supply the stored electrical energy to the second MG 12.

Figure 4:
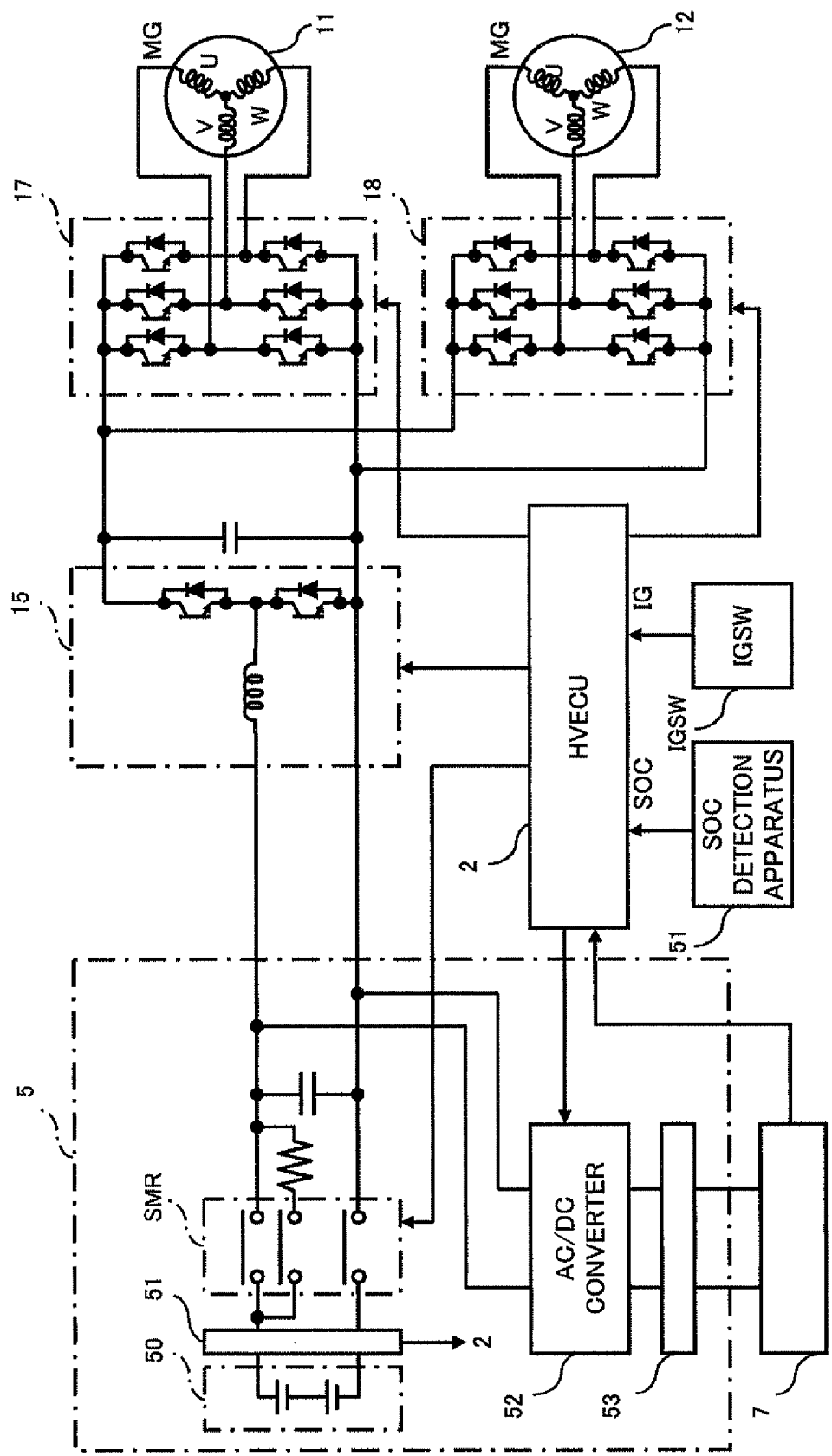
FIG. 4 is a schematic configuration diagram of the electronic control apparatus and a controlled apparatus which are related to charging control of an energy storage apparatus.

As shown in FIG. 4, the high-voltage energy storage apparatus 50 is connected to a converter 15 through a system main relay SMR. An output voltage which is adjusted to a predetermined direct-current voltage by the converter 15 is converted into an alternating-current voltage by a first inverter 17 or a second inverter 18, and then the alternating-current voltage is applied to the first MG 11 or the second MG 12.

The converter 15 includes a reactor, two npn type transistors which are electrical energy switching elements, and two diodes. One end of the reactor is connected to the positive pole side of the energy storage apparatus 50 and the other end is connected to a connection node of the two npn type transistors. The two npn type transistors are connected in series and the diodes are connected in anti-parallel to the npn type transistors, respectively.

As the npn type transistors, for example, IGBTs (Insulated Gate Bipolar Transistors) can be suitably used. Alternatively, instead of the npn type transistors, electrical energy switching elements such as power MOSFETs (Metal Oxide Semiconductor Field-Effect Transistors) can also be used.

The first inverter 17 includes a U-phase arm, a V-phase arm, and a W-phase arm which are connected to one another in parallel. Each phase arm includes two npn type transistors connected in series. A diode is connected in anti-parallel to each npn type transistor. A connection node of two npn type transistors which configure each phase arm is connected to a corresponding coil end of the first MG 11.

The first inverter 17 converts direct-current electrical energy supplied from the converter 15 into alternating-current electrical energy and supplies the alternating-current electrical energy to the first MG 11, or converts alternating-current electrical energy generated by the first MG 11 into direct-current electrical energy and supplies the direct-current electrical energy to the converter 15.

The second inverter 18 is configured in the same manner as the first inverter 17. A connection node of two npn type transistors which configure each phase arm is connected to a corresponding coil end of the second MG 12.

The second inverter 18 converts direct-current electrical energy supplied from the converter 15 into alternating-current electrical energy and supplies the alternating-current electrical energy to the second MG 12, or converts alternating-current electrical energy generated by the second MG 12 into direct current and supplies the direct current to the converter 15.

When the ignition switch IGSW is operated to ON, the HVECU 2 controls the first MG 11 and the second MG 12, based on a driver's accelerator operation, etc.

For example, the HVECU 2 controls the electrical energy switching elements in the converter 15 to step up the output voltage from the energy storage apparatus 50 to a predetermined level, and controls each phase arm in the second inverter 18 to drive the second MG 12.

For example, the HVECU 2 controls each phase arm in the first inverter 17 to convert generated electrical energy from the first MG 11 into direct-current electrical energy, steps down the direct-current electrical energy by the converter 15, and charges the energy storage apparatus 50 with the stepped-down direct-current electrical energy.

As shown in FIGS. 1 and 4, the plug-in hybrid vehicle 1 includes a charging inlet 7 used to connect a charging cable 3 for supplying charging electrical energy to the energy storage apparatus 50 from a power source external to the vehicle. Note that in FIG. 1 the charging inlet 7 is provided at the rear of a vehicle body but may be provided at the front of the vehicle body.

The charging controlled apparatus 5 includes the SOC detection apparatus 51 that detects an SOC of the energy storage apparatus 50 and outputs a detection signal to the HVECU 2; the system main relay SMR that connects the energy storage apparatus 50 to load circuits; an LC filter 53 that removes noise in alternating-current electrical energy which is supplied externally from the vehicle; and an AC/DC converter 52 that converts alternating-current electrical energy supplied externally from the vehicle into direct-current electrical energy.

Electrical energy supplied externally from the vehicle through the charging cable 3 is charged in the high-voltage energy storage apparatus 50 after being converted into direct-current electrical energy by the AC/DC converter 52 which is a charging circuit, through the LC filter 53.

The charging cable 3 has, on its one end side, a plug 32 which is connected to an external power source, e.g., a commercial power outlet provided in a house, and has, on its other end side, an attachment 34 including a connector 33 which is connected to the charging inlet 7.

Figure 5:
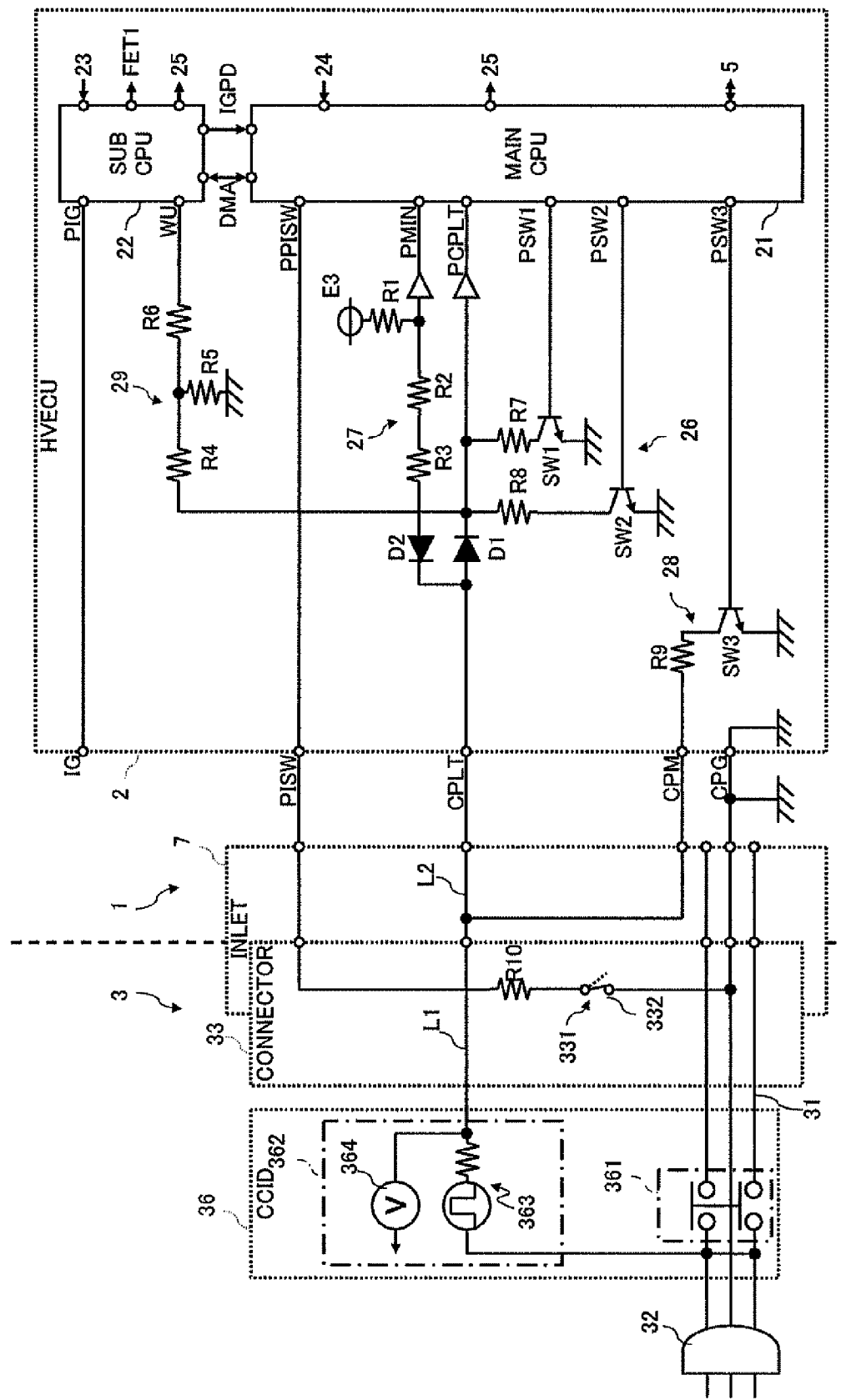
FIG. 5 is a circuit diagram for describing in detail the electronic control apparatus related to charging control of the energy storage apparatus shown in FIG. 4.

As shown in FIGS. 1 and 5, the charging cable 3 is configured by an electrical energy cable 31 that supplies alternating-current electrical energy from a commercial power source; and a CCID (Charging Circuit Interrupt Device) 36. The CCID 36 includes a relay 361 that interrupts the supply of alternating-current electrical energy through the electrical energy cable 31; and a signal generating unit 362.

The signal generating unit 362 includes circuit blocks such as an oscillating unit 363 that generates a pulse signal (hereinafter, referred to as a "control pilot signal" or "CPLT signal") indicating a rated current of the electrical energy cable 31 and a voltage detecting unit 364 that detects a signal level of the control pilot signal. These circuit blocks include a CPU, a ROM, a RAM, etc., which operate by electrical energy supplied from an external power source.

The control pilot signal outputted from the signal generating unit 362 is a signal whose state changes according to the state of electrical energy supply from an external power source, and is a signal used to perform a series of charging processes between the CCID 36 and the HVECU 2.

The connector 33 includes a connection determination circuit 331 including a switch 332 whose one end is grounded; and a resistor R10 connected in series to the switch 332. An output from the connection determination circuit 331 is inputted to the HVECU 2 as a cable connection signal PISW.

The attachment 34 is provided with a mechanical locking mechanism so as to prevent the connector 33 inserted into the charging inlet 7 from being removed, and is provided with an operation unit 35 made of an operation button for releasing the locking mechanism.

When the connector 33 of the charging cable 3 is removed from the charging inlet 7, by performing a pressing operation on the operation button, the locking mechanism is released and accordingly the connector 33 can be removed. When a pressing operation is performed on the operation button, the switch 332 in the connection determination circuit 331 is placed in an off state in response to the operation on the operation button. When the pressing operation on the operation button is released, the switch 332 returns to an on state.

As shown in FIG. 5, the connector 33 of the charging cable 3 is provided with terminal pins of a pair of electrical energy lines connected to the electrical energy cable 31, a ground terminal pin, a terminal pin of a signal line L1 which outputs a control pilot signal, and a terminal pin of a signal line of a cable connection signal outputted from the connection determination circuit 331.

The charging inlet 7 is provided with a plurality of terminal pins which are respectively connected to the terminal pins provided in the connector 33 and a disconnection detection terminal pin which is short-circuited to a control pilot signal terminal.

The disconnection detection terminal pin is a signal pin used to detect a disconnection or a short circuit of a signal line L2 on the vehicle side where a control pilot signal is communicated.

The main CPU 21 performs control of charging of the energy storage apparatus 50 mounted on the vehicle from a power source external to the vehicle through the charging cable 3, in addition to the above-described traveling control of the vehicle.

As shown in FIG. 5, the HVECU 2 is provided with a first interface circuit 26, a second interface circuit 27, and a disconnection/short circuit detection circuit 28, as peripheral circuits of the main CPU 21.

The first interface circuit 26 includes a buffer circuit that accepts as input a control pilot signal inputted through a diode D1, and a first step-down circuit including a resistor R7 and a switch SW1 and a second step-down circuit including a resistor R8 and a switch SW2, which reduce the signal level of the control pilot signal.

The main CPU 21 detects, through the buffer circuit in the first interface circuit 26, a signal level of a control pilot signal outputted from the charging inlet 7 and changes the signal level in two steps by the first step-down circuit and/or the second step-down circuit.

The second interface circuit 27 is provided with resistors (R1, R2, and R3) and a buffer circuit which input a low-level control signal to the main CPU 21 when the signal level of a control pilot signal inputted through a diode D2 is a negative level, and input a high-level control signal to the main CPU 21 when the signal level of the control pilot signal is a positive level.

The disconnection/short circuit detection circuit 28 includes a switch SW3 which is connected to the disconnection detection terminal pin and which grounds the disconnection detection terminal pin through a resistor R9.

The main CPU 21 controls the switch SW3 to detect a disconnection or a short circuit of the signal line L2 on the vehicle side.

As already described, when the ignition switch IGSW is turned on, the main CPU 21 controls the engine 10, the first MG 11, and the second MG 12 based on the above-described required torque of the vehicle, SOC of the energy storage apparatus 50, etc., to perform traveling control of the vehicle.

At this time, the main CPU 21 is configured as follows. When the main CPU 21 detects a cable connection signal PISW outputted from the connection determination circuit 331 and determines that the charging cable 3 is not connected, the main CPU 21 switches the switch SW3 in the disconnection/short circuit detection circuit 28 to on or off to determine whether the signal line L2 on the vehicle side is disconnected or not or short-circuited or not.

Figure 6:
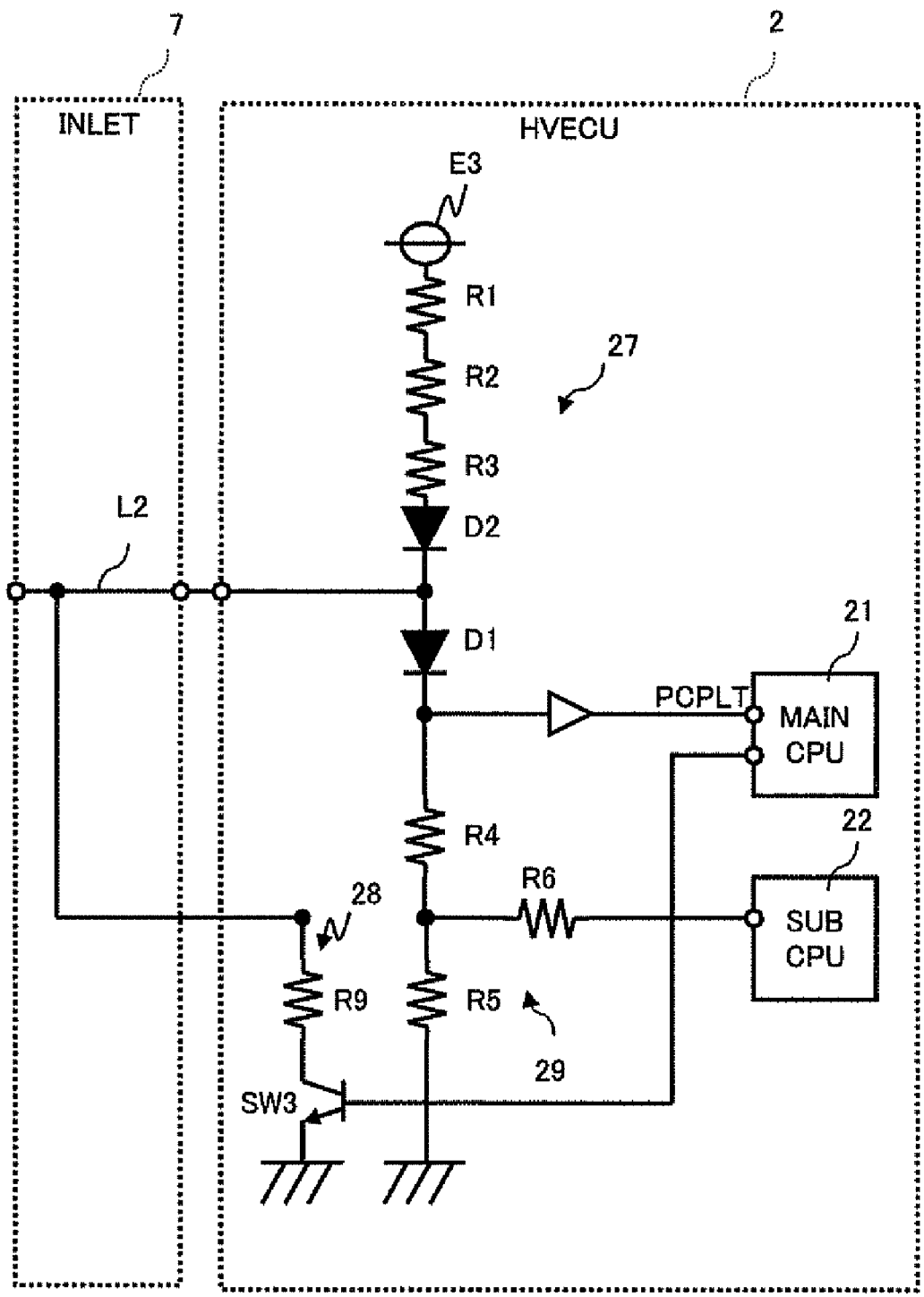
FIG. 6 is a circuit diagram of peripheral circuits related to signal line disconnection detection control.

As shown in FIG. 6, if the signal line L2 is normal, when the switch SW3 is turned off, in a current path flowing through a vehicle ground from the power source through the resistors R1, R2, and R3, the diodes D2 and D1, and resistors R4 and R5, a high-level voltage generated by the resistors R4 and R5 is inputted to the main CPU 21.

If the signal line L2 is short-circuited, when the switch SW3 is turned off, a low-level voltage is inputted to the main CPU 21.

If the signal line L2 is normal, when the switch SW3 is turned on, in a current path flowing through a vehicle ground from the power source through the resistors R1, R2, and R3, the diode D2, the resistor R9, and the switch SW3, a low-level voltage generated by the resistor R9 is inputted to the main CPU 21.

If the signal line L2 is disconnected, even when the switch SW3 is turned on, a high-level voltage is inputted to the main CPU 21.

If the voltage value of the signal line L2 is at a high level when the switch SW3 is turned off and if the voltage value of the signal line L2 is at a low level when the switch SW3 is turned on, then the main CPU 21 determines that the signal line L2 is normal.

Furthermore, if the voltage value of the signal line L2 is at a low level when the switch SW3 is turned off, then the main CPU 21 determines that the signal line L2 is short-circuited. If the voltage value of the signal line L2 is at a high level when the switch SW3 is turned on, then the main CPU 21 determines that the signal line L2 is disconnected.

If the signal line L2 is normal, a plug-in charging process which will be described later is allowed, and if the signal line L2 is abnormal, a plug-in charging process is prohibited and a monitor alerting abnormality lights up.

Note that the resistor R9 is a protective resistor for the switch SW3 and is set to a sufficiently low resistance value.

Furthermore, the HVECU 2 is provided with an edge detection circuit 29 that detects an on edge of a control pilot signal, as a peripheral circuit of the sub-CPU 22.

The edge detection circuit 29 includes resistors R4, R5, and R6 that detect a rising edge (hereinafter, referred to as an "on edge") of a control pilot signal. An output of the edge detection circuit 29 is connected to an interrupt terminal WU for wake-up of the sub-CPU 22.

Charging control will be described which is performed by the HVECU 2 to charge the energy storage apparatus 50 mounted on the vehicle, with electrical energy supplied through the charging cable 3 from a power source external to the vehicle.

The sub-CPU 22 of the present invention is configured as follows. When the state of a signal according to the state of electrical energy supply from a power source external to the vehicle which is outputted from the signal generating unit 362 included in the charging cable 3 changes from a state with no change for a certain period of time, the sub-CPU 22 turns on a charging mode signal to activate the main CPU 21. When the sub-CPU 22 detects a charging completion signal which is turned on by the main CPU 21, the sub-CPU 22 turns off the charging mode signal.

The main CPU 21 of the present invention is configured as follows. When the main CPU 21 detects a charging mode signal which is turned on by the sub-CPU 22, the main CPU 21 charges the energy storage apparatus 50 through the charging cable 3. When the main CPU 21 completes the charging, the main CPU 21 turns on a charging completion signal. Thereafter, when the main CPU 21 detects that the charging mode signal has been turned off by the sub-CPU 22, the main CPU 21 turns off the charging completion signal.

Figure 7:
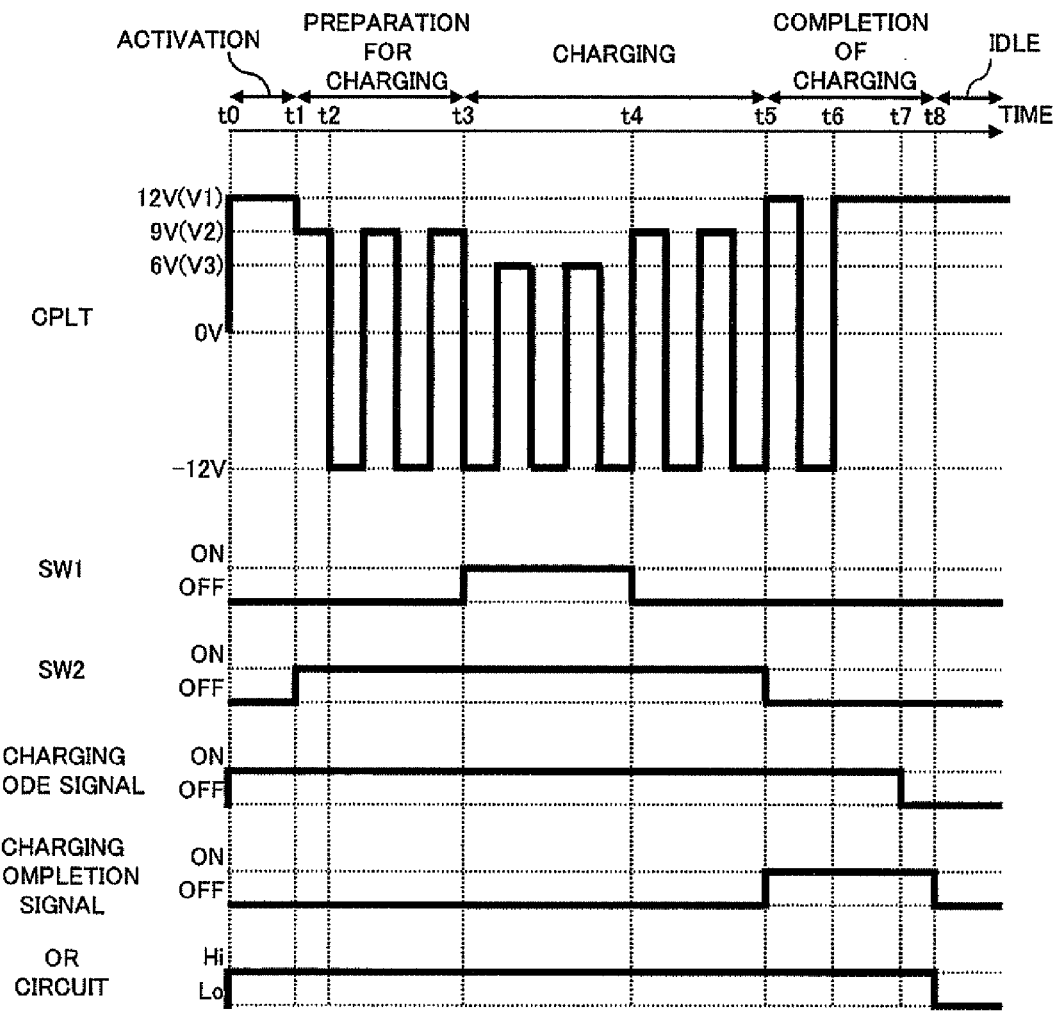
FIG. 7 is a timing chart of a control signal and switches which are related to charging control of the energy storage apparatus.
Figure 9:
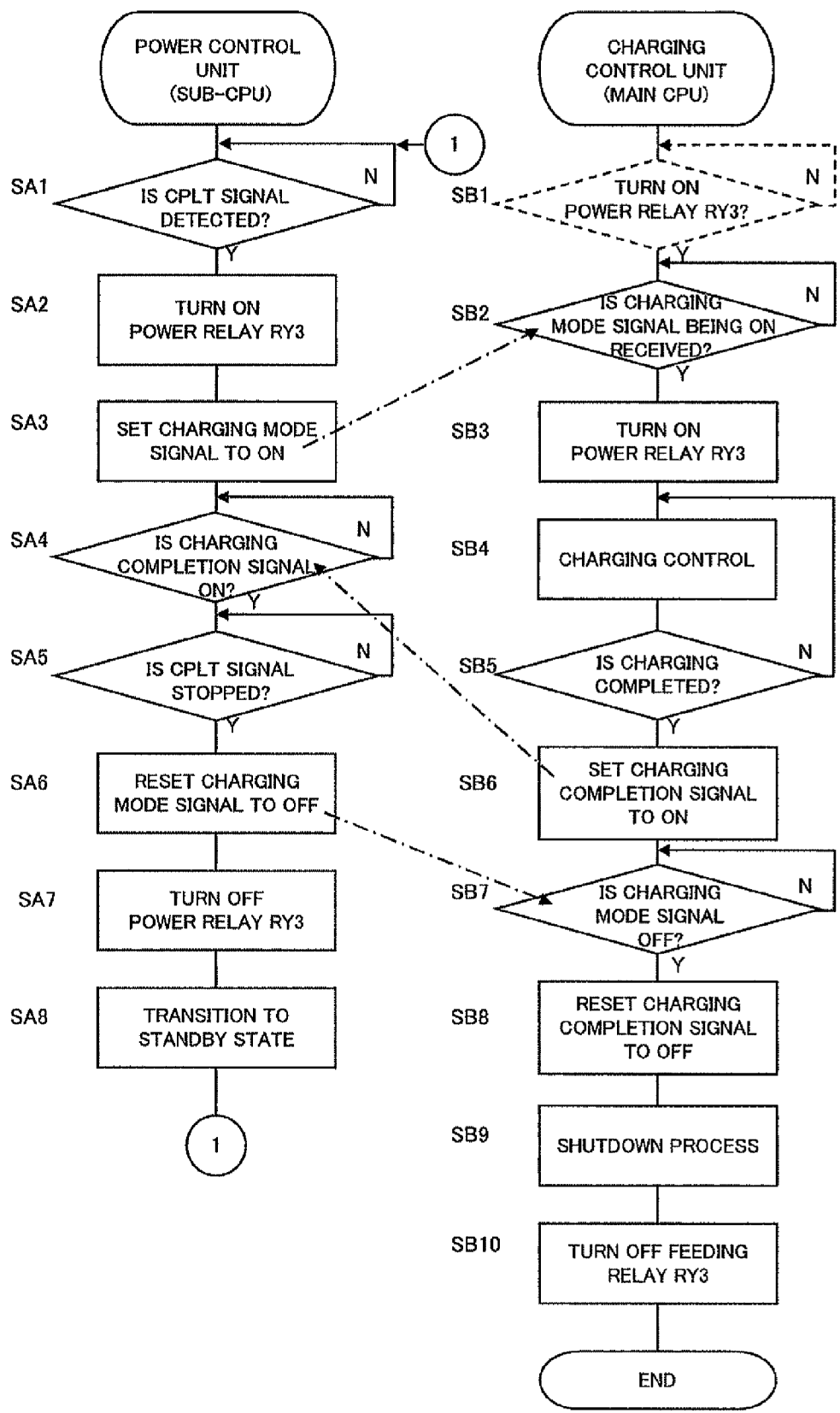
FIG. 9 is a flowchart describing a power control step and a charging control step.

A specific description will be made below. As shown in FIGS. 7 and 9, when, with the sub-CPU 22 having transitioned to a standby state, the plug 32 of the charging cable 3 is connected to an external power outlet and the connector 33 of the charging cable 3 is placed in the charging inlet 7, a control pilot signal of a direct-current voltage V1 (e.g., +12 V) is outputted from the signal generating unit 362 (time t0 in FIG. 7).

As shown in FIGS. 3 and 5, when the control pilot signal of the direct-current voltage V1 is inputted to the interrupt terminal WU of the sub-CPU 22 through the signal lines L1 and L2, the signal level changes to the voltage V1 from a state with no change for a certain period of time, whereby the sub-CPU 22 returns to a normal operating state from the standby state (SA1 in FIG. 9).

That is, the sub-CPU 22 wakes up by an on edge of the control pilot signal being inputted to the interrupt terminal WU.

When the sub-CPU 22 having returned to the normal operating state from the standby state outputs a high-level control signal to one input terminal of the OR circuit 25, by the FET2 having been turned on by an output signal from the OR circuit 25, the power relay RY3 is turned on (SA2 in FIG. 9).

When feeding to the loads connected to the third feeding system 83 starts through the power relay RY3, the main CPU 21 is activated (SB1 in FIG. 9).

When the sub-CPU 22 sets a charging mode signal for requesting to perform charging control to on and stores the charging mode signal in the RAM 222, the charging mode signal is DMA transferred to the main CPU 21 (SA3 in FIG. 9).

The main CPU 21 having detected the charging mode signal (SB2 in FIG. 9) outputs a high-level signal to the other input terminal of the OR circuit 25 to maintain the on-state of the power relay RY3 (SB3 in FIG. 9) and starts a process of charging the high-voltage energy storage apparatus 50, i.e., a charging control step, through the charging controlled apparatus 5 (SB4 in FIG. 9). A charging completion signal to be DMA transferred to the sub-CPU 22 from the main CPU 21 is stored in the RAM 212 in an initial state in which the charging completion signal is reset to off.

Note that the main CPU 21 may be configured to detect the control signal outputted to the OR circuit 25 from the sub-CPU 22 as the charging mode signal.

When the main CPU 21 detects at time t1 the voltage V1 (+12 V) of the control pilot signal, the main CPU 21 turns on the switch SW2 in the second step-down circuit to step down the voltage level of the control pilot signal from V1 to V2 (e.g., +9 V).

When the signal generating unit 362 detects at time t2 through the voltage detecting unit 364 that the signal level of the control pilot signal has dropped from V1 to V2, the signal generating unit 362 outputs, as a control pilot signal, a pulse signal of a predetermined frequency (e.g., 1 KHz) at a predetermined duty cycle, which is generated by the oscillating unit 363.

Note that although the signal level of the control pilot signal outputted from the signal generating unit 362 is ±V1, its upper limit level is stepped down to V2 by the second step-down circuit included in the HVECU 2.

Figure 8A:
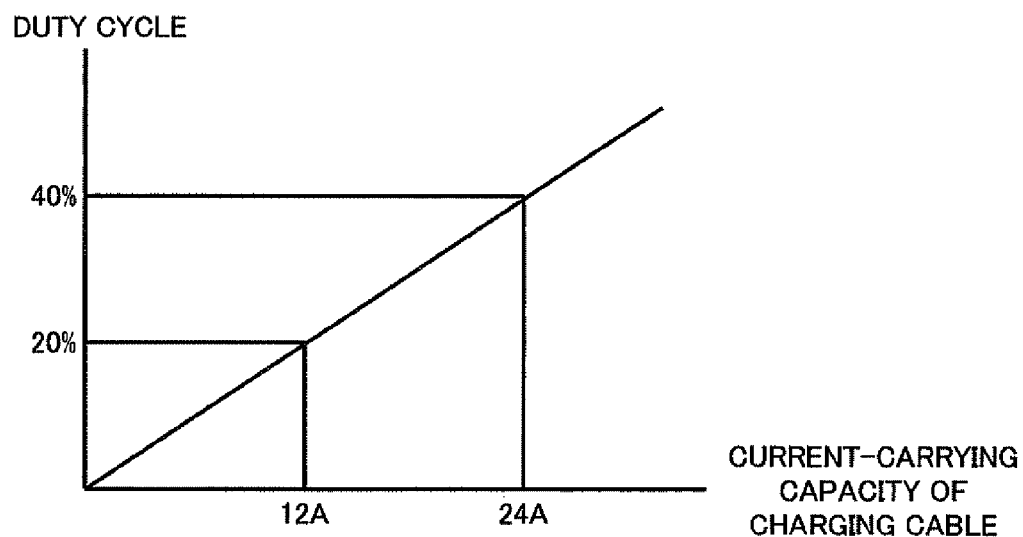
FIG. 8A is an illustrative diagram showing duty cycle relative to current capacity of a charging cable and FIG. 8B is a waveform diagram of a control pilot signal generated by a signal generating unit.
Figure 8B:
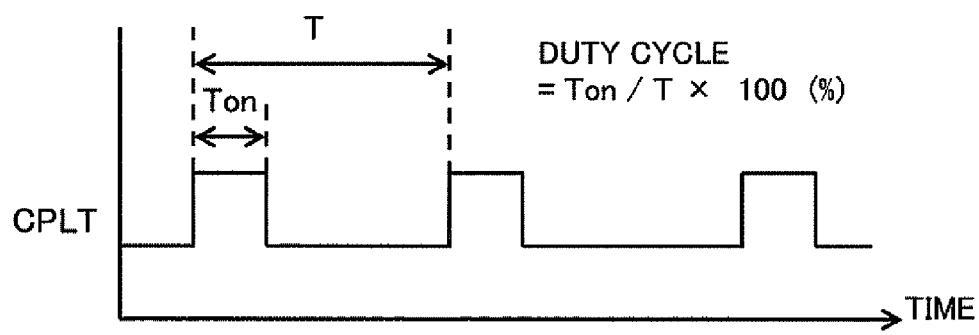

As shown in FIGS. 8A and 8B, the duty cycle of the control pilot signal is a value set based on current-carrying capacity suppliable to the vehicle from the external power source through the charging cable 3, and is set in advance for each chargeable cable. For example, the duty cycle is set to 20% for a charging cable with a current-carrying capacity of 12 A and is set to 40% for a charging cable with a current-carrying capacity of 24 A.

Referring back to FIG. 7, the main CPU 21 detects the duty cycle of the control pilot signal and thereby recognizes the current-carrying capacity of the charging cable 3. At time t3, the main CPU 21 closes the system main relay SMR (see FIG. 4) and, with the switch SW2 in the second step-down circuit being turned on, further turns on the switch SW1 in the first step-down circuit to step down the voltage level of the control pilot signal from V2 to V3 (e.g., +6 V).

When the signal generating unit 362 detects that the signal level of the control pilot signal has dropped from V2 to V3, the signal generating unit 362 turns on the relay 361 to supply alternating-current electrical energy to the vehicle side through the electrical energy cable 31.

The main CPU 21 thereafter controls the AC/DC converter 52 (see FIG. 4) based on an SOC inputted through the SOC detection apparatus 51 included in the charging controlled apparatus 5, etc., to charge the energy storage apparatus 50.

When the main CPU 21 detects at time t4 that the SOC of the energy storage apparatus 50 has reached a predetermined level, the main CPU 21 stores the level of the SOC in the RAM 212 and the nonvolatile memory and stops the AC/DC converter 52 (S85 in FIG. 9).

The main CPU 21 opens the system main relay SMR (see FIG. 4) and turns off the switch SW1 in the first step-down circuit to step up the voltage level from V3 to V2.

When the signal generating unit 362 detects that the level of the control pilot signal has risen to V2 from V3, the signal generating unit 362 turns off the relay 361 to stop the supply of alternating-current electrical energy to the vehicle side.

The main CPU 21 turns off, at time t5, the switch SW2 in the second step-down circuit to bring the level of the control pilot signal back to the initial V1 and sets the charging completion signal stored in the RAM 212 to on (SB6 in FIG. 9).

When the signal generating unit 362 detects that the level of the control pilot signal has risen to V1 from V2, the signal generating unit 362 stops the oscillation of the control pilot signal. It takes about two seconds for the oscillation of the control pilot signal to completely stop.

When the sub-CPU 22 detects the charging completion signal being in an on state which is DMA transferred from the main CPU 21, the sub-CPU 22 waits until the oscillation of the control pilot signal stops (SA5 in FIG. 9).

The sub-CPU 22 detects at time t6 that the oscillation of the control pilot signal inputted to the interrupt terminal WU has stopped. When this state continues for a predetermined period of time (e.g., two seconds), the sub-CPU 22 resets, at time t7, the charging mode signal stored in the RAM 222 to off (SA6 in FIG. 9).

Subsequently, the sub-CPU 22 outputs a low-level control signal to one input terminal of the OR circuit 25 to turn off the power relay RY3 (SA7 in FIG. 9), and returns to a standby state (SA8 in FIG. 9).

When the main CPU 21 detects at time t8 that the charging mode signal which is DMA transferred from the sub-CPU 22 is in an off state (SB7 in FIG. 9), the main CPU 21 resets the charging completion signal stored in the RAM 212 to off (SB8 in FIG. 9) and further performs a shutdown process in which data pertaining to charging, such as the SOC, stored in the RAM 212 is stored in the nonvolatile memory (SB9 in FIG. 9).

Thereafter, the main CPU 21 outputs a low-level control signal to the other input terminal of the OR circuit 25 to turn off the power relay RY3 (SB10 in FIG. 9).

Namely, when it is detected that the state of a control pilot signal which is outputted from the signal generating unit 362 included in the charging cable 3 changes from a state with no change for a certain period of time, a charging mode signal is turned on to start a charging control step by the main CPU 21. When a charging completion signal which is turned on in the charging control step is detected, a power control step in which the charging mode signal is turned off is performed by the sub-CPU 22.

In addition, a charging control step is performed by the main CPU 21, in which when the charging mode signal which is turned on in the power control step is detected, the energy storage apparatus mounted on the vehicle is charged with electrical energy supplied from a power source external to the vehicle through the charging cable; when the charging is completed, the charging completion signal is turned on; and when it is detected, after the charging completion signal is turned on, that the charging mode signal is turned off in the power control step, the charging completion signal is turned off.

Furthermore, in the present invention, the main CPU 21 is configured to set the charging completion signal to on when detecting that electrical energy supply from the external power source has been stopped, such as when the connector of the charging cable 3 is removed from the vehicle while the above-described charging control step is performed. The sub-CPU 22 is configured to reset the charging mode signal to off when detecting that the DMA transferred charging completion signal has been turned on.

Then, as with the above-described control performed at time t8, the main CPU 21 is configured to reset the charging completion signal to off when detecting that the charging mode signal has been reset to off when the charging completion signal is in an on state.

Thus, according to the present invention, when the charging mode signal which is DMA transferred from the sub-CPU 22 is turned off, the charging completion signal being in an on state is immediately turned off by the main CPU 21 and thus the charging completion signal is not held in an on state during a period of time between after charging control is completed and before feeding to the main CPU 21 is stopped.

Therefore, even when the connector of the charging cable 3 is pulled out of the vehicle in the process of charging and the connector is reconnected to the charging inlet of the vehicle during a period of time between after the pulling out and before feeding to the main CPU 21 is stopped, charging can be reliably resumed.

This is because when the sub-CPU 22 detects an on edge of the control pilot signal and outputs a charging mode signal being in an on state to the main CPU 21, a charging completion signal which is DMA transferred from the main CPU 21 is turned off, and thus, an erroneous determination that charging has been completed is not made.

Note that if, with the oscillation of the control pilot signal being not completely stopped (the state at time t5 in FIG. 7), the sub-CPU 22 immediately turns off the charging mode signal based on the charging completion signal being in an on state which is DMA transferred from the main CPU 21, and transitions to a standby state, an inconvenient situation may occur in which the sub-CPU 22 wakes up by an on edge of the control pilot signal afterward and sets the charging mode signal to on.

Hence, in the present invention, the sub-CPU 22 is configured such that, when the sub-CPU 22 detects that the charging completion signal has been turned on in the charging control step, the sub-CPU 22 turns off the charging mode signal after detecting that the oscillation of the control pilot signal has stopped.

Although the above-described embodiment describes the case in which the present invention is applied to a series/parallel type hybrid vehicle in which the power of the engine 10 is split by the power split mechanism 13 and the split powers can be transmitted to the driving wheels 16 and the first MG 11, the present invention can also be applied to hybrid vehicles of other types.

For example, the present invention can also be applied to a so-called series type hybrid vehicle in which an engine 10 is used only to drive a first MG 11 and a driving force of the vehicle is generated only by a second MG 12.

In addition, the present invention can also be applied to a hybrid vehicle in which only regenerated energy is collected as electrical energy of kinetic energy generated by an engine 10, a motor assist type hybrid vehicle in which an engine is the main power and a motor assists if necessary, and the like.

Furthermore, the present invention can be applied to all plug-in vehicles that include an energy storage apparatus which can be charged with external electrical energy, even an electric vehicle that does not include an engine 10 but includes only a motor and travels by electrical energy, or a vehicle having mounted thereon fuel cells.

Each of the above-described embodiments is one specific example and thus any design change can be appropriately made to specific circuit configurations and control configurations of the respective units within a range in which the functions and effects of the present invention are exhibited.

DESCRIPTION OF REFERENCE NUMERALS

1: PLUG-IN HYBRID VEHICLE
2: HVECU (ELECTRONIC CONTROL APPARATUS)
3: CHARGING CABLE
5: CHARGING CONTROLLED APPARATUS
7: CHARGING INLET
8: LOW-VOLTAGE ENERGY STORAGE APPARATUS
10: ENGINE
11: FIRST MG (MOTOR GENERATOR)
12: SECOND MG (MOTOR GENERATOR)
13: POWER SPLIT MECHANISM
14: SPEED REDUCER
15: CONVERTER
16: DRIVING WHEEL
17: FIRST INVERTER
18: SECOND INVERTER
21: MAIN CPU
22: SUB-CPU
23: REGULATOR (FIRST FEEDING SYSTEM)
24: REGULATOR (THIRD FEEDING SYSTEM)
25: OR CIRCUIT (HVECU)
26: FIRST INTERFACE CIRCUIT (HVECU)
27: SECOND INTERFACE CIRCUIT (HVECU)
28: DISCONNECTION/SHORT CIRCUIT DETECTION CIRCUIT
29: EDGE DETECTION CIRCUIT (HVECU)
31: ELECTRICAL ENERGY CABLE
32: PLUG
33: CONNECTOR
35: OPERATION UNIT
36: CCID (CHARGING CIRCUIT INTERRUPT DEVICE)
50: ENERGY STORAGE APPARATUS
51: SOC DETECTION APPARATUS
52: AC/DC CONVERTER
53: LC FILTER
331: CONNECTION DETERMINATION CIRCUIT (CONNECTOR)
332: SWITCH (CONNECTOR)
361: RELAY (CCID)
362: SIGNAL GENERATING UNIT (CCID)
363: OSCILLATING UNIT (SIGNAL GENERATING UNIT)
364: VOLTAGE DETECTING UNIT (SIGNAL GENERATING UNIT)
IGSW: IGNITION SWITCH
L2: SIGNAL LINE (VEHICLE SIDE)
PISW: CABLE CONNECTION SIGNAL
RY2: POWER RELAY (SECOND FEEDING SYSTEM)
RY3: POWER RELAY (THIRD FEEDING SYSTEM)
SMR: SYSTEM MAIN RELAY (CHARGING CONTROLLED APPARATUS)

SW1: SWITCH (FIRST STEP-DOWN CIRCUIT)
SW2: SWITCH (SECOND STEP-DOWN CIRCUIT)
SW3: SWITCH (DISCONNECTION/SHORT CIRCUIT DETECTION SWITCH)
WU: INTERRUPT TERMINAL (ON EDGE SIGNAL)

The invention claimed is:

1. A control apparatus that charges an energy storage apparatus mounted on a vehicle, with electrical energy supplied through a charging cable from a power source external to the vehicle, the control apparatus comprising:
 a power control unit that turns on a charging mode signal when a state of a signal changes from a state with no change for a certain period of time to a state with a change, to activate a charging control unit, and turns off the charging mode signal when detecting a charging completion signal which is turned on by the charging control unit, the signal being outputted from a signal generating unit included in the charging cable and being according to a state of electrical energy supply from the power source; and
 the charging control unit that charges the energy storage apparatus through the charging cable when detecting the charging mode signal which is turned on by the power control unit, and turns on the charging completion signal when the charging has been completed, and thereafter turns off the charging completion signal when detecting that the charging mode signal has been turned off by the power control unit.

2. A control apparatus that charges an energy storage apparatus mounted on a vehicle, with electrical energy supplied through a charging cable from a power source external to the vehicle, the control apparatus comprising:
 a power control unit that turns on a charging mode signal when a state of a signal changes from a state with no change for a certain period of time to a state with a change, to activate a charging control unit, and turns off the charging mode signal when detecting a charging completion signal which is turned on by the charging control unit, the signal being outputted from a signal generating unit included in the charging cable and being according to a state of electrical energy supply from the power source; and
 the charging control unit that charges the energy storage apparatus through the charging cable when detecting the charging mode signal which is turned on by the power control unit, and turns on the charging completion signal when the charging has been completed, and thereafter turns off the charging completion signal when detecting that the charging mode signal has been turned off by the power control unit, wherein when the power control unit detects that the charging completion signal outputted from the charging control unit has been turned on, the power control unit turns off the charging mode signal after oscillation of a control signal has stopped.

3. The control apparatus according to claim 1, wherein when the charging control unit detects that the charging mode signal has been turned off by the power control unit, the charging control unit turns off the charging completion signal and performs a shutdown process in which data pertaining to the charging is stored in a memory and thereafter stops the operation, and when the charging control unit detects that the charging mode signal has been turned on while the shutdown process is performed, the charging control unit charges the energy storage apparatus again.

4. A control method for charging an energy storage apparatus mounted on a vehicle, with electrical energy supplied through a charging cable from a power source external to the vehicle, the control method comprising:
 a power control step of turning on a charging mode signal when a state of a signal changes from a state with no change for a certain period of time to a state with a change, to start a charging control step, and turning off the charging mode signal when a charging completion signal which is turned on in the charging control step is detected, the signal being outputted from a signal generating unit included in the charging cable and being according to a state of electrical energy supply from the power source; and
 the charging control step of charging the energy storage apparatus through the charging cable when the charging mode signal which is turned on in the power control step is detected, and turning on the charging completion signal when the charging has been completed, and thereafter turning off the charging completion signal when it is detected that the charging mode signal has been turned off in the power control step.

5. The control method according to claim 4, wherein in the power control step, when it is detected that the charging completion signal has been turned on in the charging control step, the charging mode signal is turned off after oscillation of a control signal has stopped.

6. The control apparatus according to claim 2, wherein when the charging control unit detects that the charging mode signal has been turned off by the power control unit, the charging control unit turns off the charging completion signal and performs a shutdown process in which data pertaining to the charging is stored in a memory and thereafter stops the operation, and when the charging control unit detects that the charging mode signal has been turned on while the shutdown process is performed, the charging control unit charges the energy storage apparatus again.

\* \* \* \* \*

UNITED STATES PATENT AND TRADEMARK OFFICE
CERTIFICATE OF CORRECTION

PATENT NO.       : 8,179,086 B2
APPLICATION NO.  : 12/682823
DATED            : May 15, 2012
INVENTOR(S)      : Yoshiaki Nakaso et al.

Page 1 of 1

It is certified that error appears in the above-identified patent and that said Letters Patent is hereby corrected as shown below:

Column 14, line 9, please delete the following:

"(S85 in FIG. 9)."

And replace with:

(SB5 in FIG. 9).

Signed and Sealed this
Thirty-first Day of July, 2012

David J. Kappos
*Director of the United States Patent and Trademark Office*